US005254479A

United States Patent [19]

Chemelli

[11] Patent Number: 5,254,479

[45] Date of Patent: Oct. 19, 1993

[54] METHODS FOR PREVENTING AIR INJECTION INTO A DETECTION CHAMBER SUPPLIED WITH INJECTED LIQUID

[75] Inventor: John B. Chemelli, Webster, N.Y.

[73] Assignee: Eastman Kodak Company, Rochester, N.Y.

[21] Appl. No.: 810,945

[22] Filed: Dec. 19, 1991

[51] Int. Cl.[5] ........................ G01N 1/10; G01N 21/00

[52] U.S. Cl. .................................... 436/180; 436/177; 422/58; 422/102

[58] Field of Search ..................... 422/55, 58, 61, 102, 422/103; 436/165, 180, 808, 174, 177; 435/287, 300, 301; 206/219; 383/66, 84

[56] References Cited

U.S. PATENT DOCUMENTS

| | | | |
|---|---|---|---|
| 3,036,894 | 5/1962 | Forestiere | 422/61 |
| 3,713,779 | 1/1973 | Sirago et al. | 436/165 |
| 4,007,010 | 2/1977 | Woodbridge, III | 422/58 |
| 4,065,263 | 12/1977 | Woodbridge, III | 422/57 |
| 4,708,931 | 11/1987 | Christian | 435/7 |
| 4,795,265 | 1/1989 | Dahlberg et al. | 206/219 |
| 4,965,047 | 10/1990 | Hammond | 422/61 |
| 5,061,446 | 10/1991 | Guigan | 422/64 |
| 5,154,888 | 10/1992 | Zander et al. | 422/58 |

*Primary Examiner*—James C. Housel
*Assistant Examiner*—N. Bhat
*Attorney, Agent, or Firm*—Dana M. Schmidt

[57] ABSTRACT

A method for forcing liquid out of a burstable compartment into a detection chamber without also forcing residual air of that compartment to interfere with liquid detection. The method features applying pressure sufficient to eject the liquid but not the residual air, and retaining that pressure as long as the reaction period of the liquid takes place, called the incubation period, and then completing the ejection to eject residual air into the chamber.

8 Claims, 5 Drawing Sheets

METHODS FOR PREVENTING AIR INJECTION INTO A DETECTION CHAMBER SUPPLIED WITH INJECTED LIQUID

FIELD OF THE INVENTION

This invention relates to cuvettes used to process a liquid in a detection chamber by forcing the liquid out of a closed compartment into that chamber.

BACKGROUND OF THE INVENTION

Flexible reaction cuvettes are known for carrying out reactions, such as PCR (polymerase chain reaction) amplification, followed by detection in a detection chamber. Such devices are disclosed, e.g., in EPA 381,501. In these devices, liquid reagents are pre-filled into burstable compartments connected via passageways to the detection chamber. The connections of the compartments to the passageways are given temporary seals which, until burst, prevent liquid from advancing to the chamber. Additionally, a PCR reaction compartment is provided into which a user injects patient liquid for testing. This compartment is also temporarily sealed in the same way, and temperature cycled to provide amplification of targeted DNA.

Bursting of the seals is preferably accomplished by processors having exterior pressure means, e.g. rollers, such as are shown in EPA 402,994. These are associated with heaters which can be used to heat the next compartment after an upstream one has been burst. Thereafter the pressure means are moved on to the now-heated next compartment to burst that one.

Although such reaction cuvettes and processors work well, there are occasions in which the color production is less than it should be. It has been discovered that this is due in part to the presence of air bubbles in the detection chamber which interfere with the necessary liquid reactions between the solutions transferred thereto and the detection sites of the chamber. It has further been found that such air bubbles come from upstream compartments which, because they have not been completely filled with liquid, have residual air that ends up being transferred to the detection chamber as the pressure rollers roll across the compartments to burst them. It is this air that can interfere with reaction in the detection chamber. Although one can envision correcting this by ensuring that reagent compartments are completely prefilled during manufacturing with liquid and no residual air, occasionally this does not happen and cuvettes having such residual air would have to be discarded, creating a waste of materials. Even in the absence of such failures, the exclusion of residual air does require a more complicated and therefore more expensive manufacturing process. But even if no reagent compartments fail to exclude all residual air, there is still a potential problem - the PCR reaction compartment is filled by the user, sealed and then heated. There has been no practical way of ensuring that that reaction compartment ends up with no residual air.

Accordingly, prior to this invention, there has been a need to process such cuvettes in such a way as to preclude residual air from the compartments from entering the detection chamber while liquid reactions have to take place.

SUMMARY OF THE INVENTION

I have discovered a method of processing which solves the aforesaid problems.

More specifically, there is provided a method of preventing air from interfering with liquid reactions involving a solution in a detection chamber, the solution being transferred to the chamber from a first burstable compartment connected via a passageway in a generally horizontally positioned cuvette and containing both the solution and residual air. The method comprises the steps of a) bursting the compartment with pressure supplied by exterior pressure means that pushes the solution into the chamber but not the residual air, b) keeping the pressure means on the compartment at a location sufficient to leave residual air in said compartment during the time of the liquid reactions in the chamber, and c) thereafter, also ejecting any residual air left in the compartment by pressure exerted by the exterior pressure means.

Accordingly, it is an advantageous feature of the invention that a reaction cuvette can be processed by transferring liquid to a detection chamber for liquid reaction therewith without also transferring residual air volume that can interfere with the reaction, if any air is located above the liquid prior to transfer.

It is a related advantageous feature of the invention that such processing can be done regardless whether the cuvette is successfully supplied with compartments containing liquid for transfer and no residual air. Thus, it is an advantageous feature that expensive manufacturing processes for excluding residual air from those compartments need not be used.

Other advantageous features will become apparent from the following Detailed Description when read in light of the attached drawings.

BRIEF DESCRIPTION OF THE DRAWINGS

FIGS. 3B and 3C illustrate the method of the invention;

DETAILED DESCRIPTION OF THE PREFERRED EMBODIMENT

The invention is hereinafter described in connection with certain preferred embodiments, in which a particular flexible cuvette is processed by a certain processor which orients the cuvettes horizontally for amplification and detection of DNA. Additionally, the invention is useful regardless of the peculiar construction of the cuvette and/or processor, and regardless whether the cuvette is processed horizontally or while inclined up to 20° from the horizontal position, as long as there is a burstable compartment which feeds liquid to a detection chamber when burst, with the risk that residual air is also present in such compartment. Still further, it is useful regardless of the liquid contents of the compartment to be burst—that is, this invention does not concern or require any particular chemistry or reaction, so long as air pockets or bubbles would interfere if present. Hence, the invention is independent of the particular liquid reaction occurring at the detection chamber and is not limited just to DNA detection.

Figure 1:
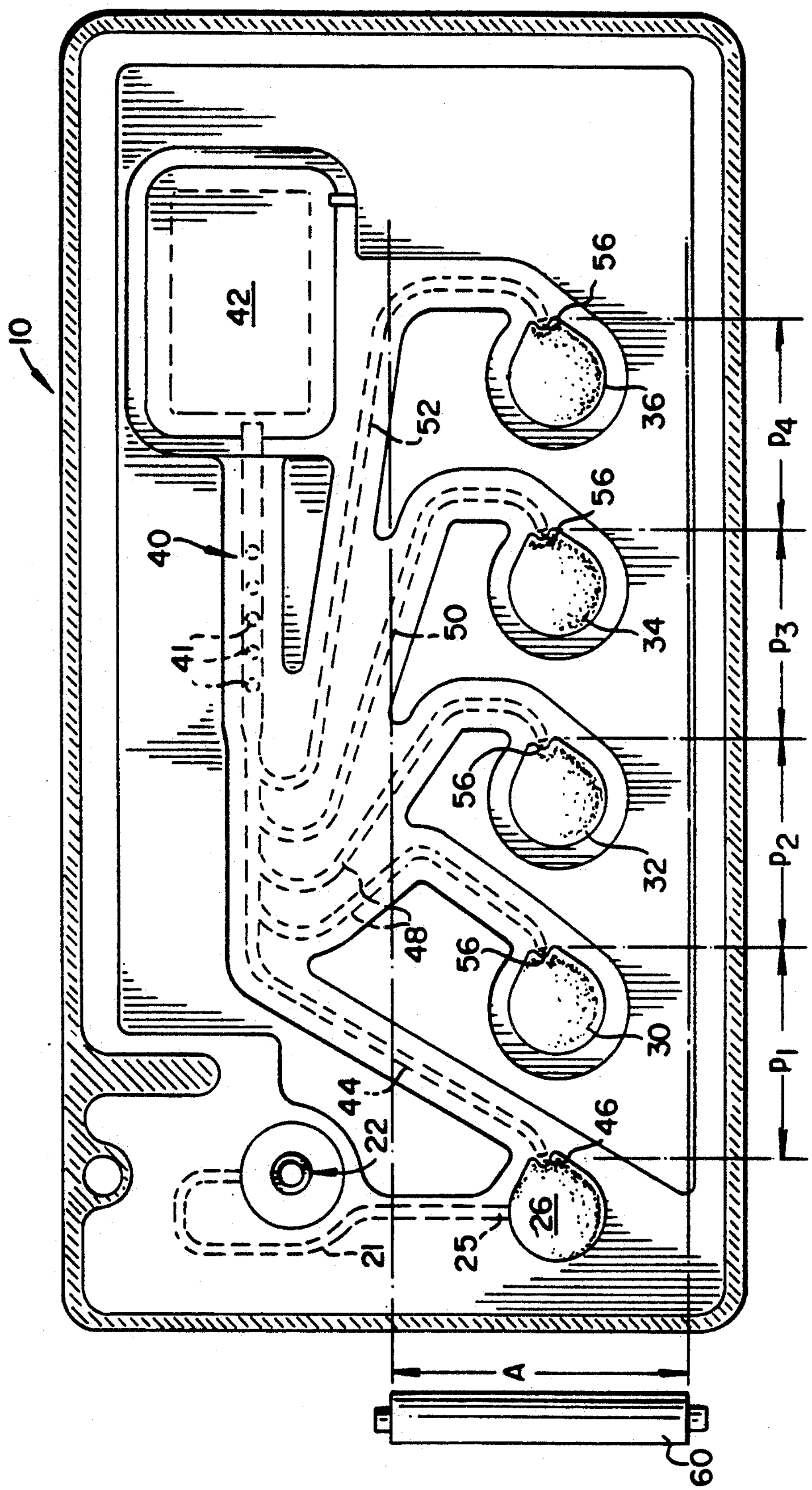
FIG. 1 is a plan view of a cuvette processable by the invention using a roller.

As shown in FIG. 1, reaction cuvettes 10 useful with the invention comprise those having an inlet port 22 for patient injection of sample liquid, which connects via a passageway 21 to a PCR reaction compartment 26. A seal 46 temporarily blocks flow out of compartment 26. When seal 46 is broken, liquid feeds via a passageway 44 to a detection chamber 40 having sites 41 comprising, preferably, beads anchored in place which will complex with any targeted analyte passing them from compartment 26, and then with reagents coming from the other reagent compartments. Those other compartments are compartments 30, 32, 34 and optionally additional compartments 36, each feeding via passageways 48, 50, and 52, to chamber 40. Each of those passageways is temporarily sealed at 56, and contains an appropriate reagent liquid (and possibly, residual air).

The details of the chemicals useful in all the compartments, and of the sites 41, are explained in more detail in the aforesaid EPA 381,501. However, since the time of the invention of EPA 381,501, the number of necessary compartments has been simplified. Hence compartments 26, 30, 32, and 34 preferably comprise:

Compartment 26, in addition to the patient liquid later added by the user, preferably includes all the conventional reagents needed for PCR amplification, kept in place by temporary seal 25. This includes primers that are bound to one member of a binding pair, the other member of which appears in compartment 30 described below. A useful example of the binding member attached to a primer is biotin. (Seal 25 is burst by injecting sample.)

Compartment 30 comprises, preferably, an enzyme bound to a complexing agent, such as avidin, that is a member of a binding pair, the other member of that pair being bound to a targeted analyte in the reaction compartment 26 as described above. Hence, a useful reagent in compartment 30 is strep-avidin horseradish peroxidase (hereinafter, strep-avidin HRP).

Compartment 32 preferably comprises a wash solution as the reagent.

Compartment 34 preferably comprises a signal precursor, and any dye stabilizing agent that may be useful. Thus, for example, a useful reagent solution in compartment 34 is a solution of a leuco dye that is a conventional substrate for the enzyme of compartment 30.

The remaining compartments 36 are preferably eliminated, along with their passageways, but can be optionally added. Hence, if a wash is desired prior to adding the leuco dye of compartment 34, then such wash is provided by compartment 34 and the leuco dye is moved to compartment 36, and so forth.

Compartment 42 is a waste-collecting compartment.

Roller 60 exemplifies the exterior pressure means used to burst each of the compartments sequentially, to sequentially advance the contents of the respective compartment to detection chamber 40.

Figure 2:
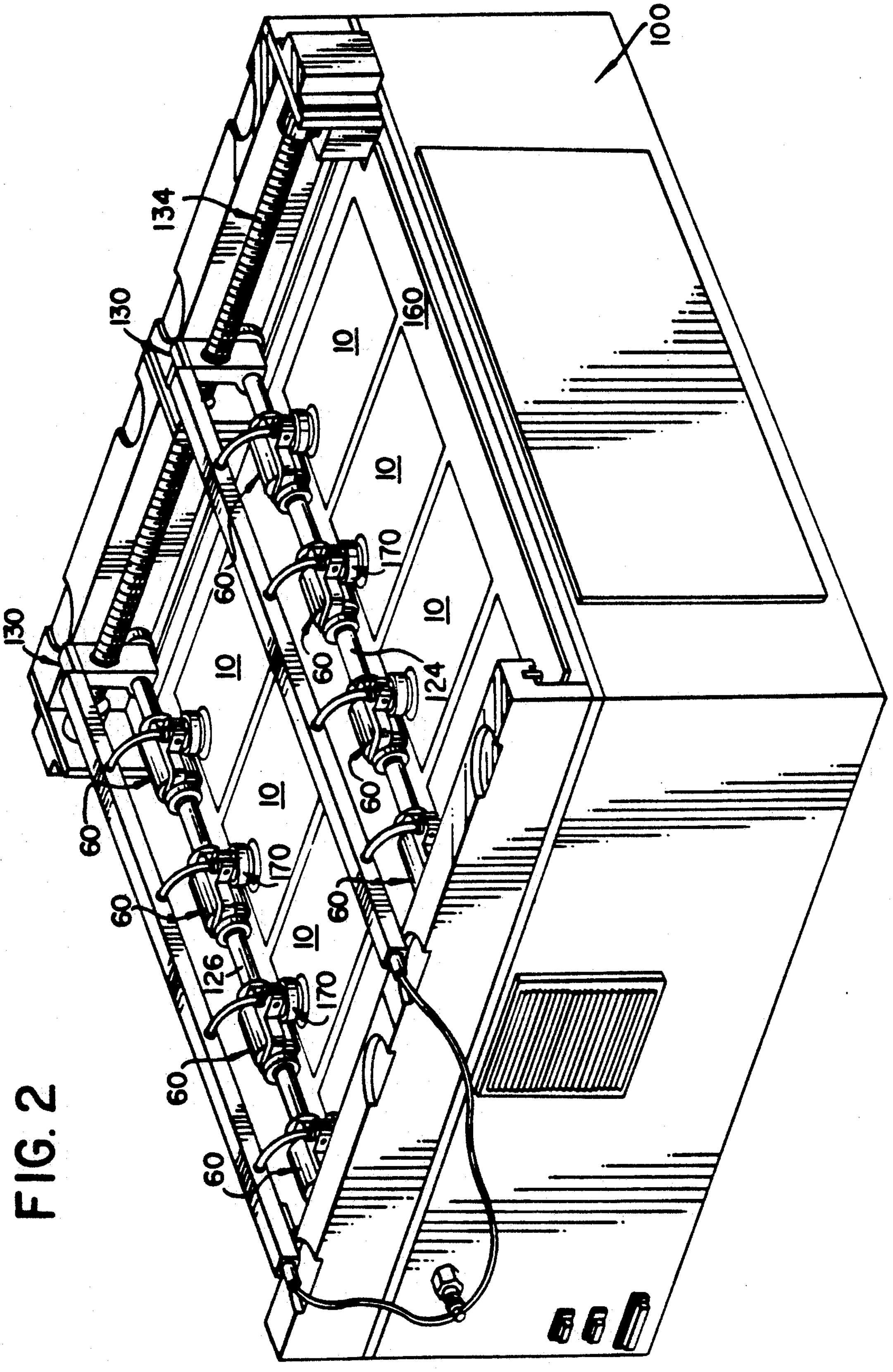
FIG. 2 is an isometric view of a processor useful with the invention.

FIGS. 2 illustrates a useful processor. As noted, complete details are given in EPA 402,994. Preferably, there is provided a support surface 160 on which cuvettes 10 are placed in an array, and pressure members, e.g., rollers 60, are mounted in position to process each of the cuvettes in parallel. As shown, the rollers are journalled several to one axle 124 or 126 for convenience, these axles being incrementally advanced by gearing 130 and 134. Preferably, surface 160 is horizontal, with possible variants mentioned hereinafter regarding FIG. 3A. Additionally, heaters 170 can be optionally included, carried with the rollers as described in more detail hereinafter.

Figure 3A:
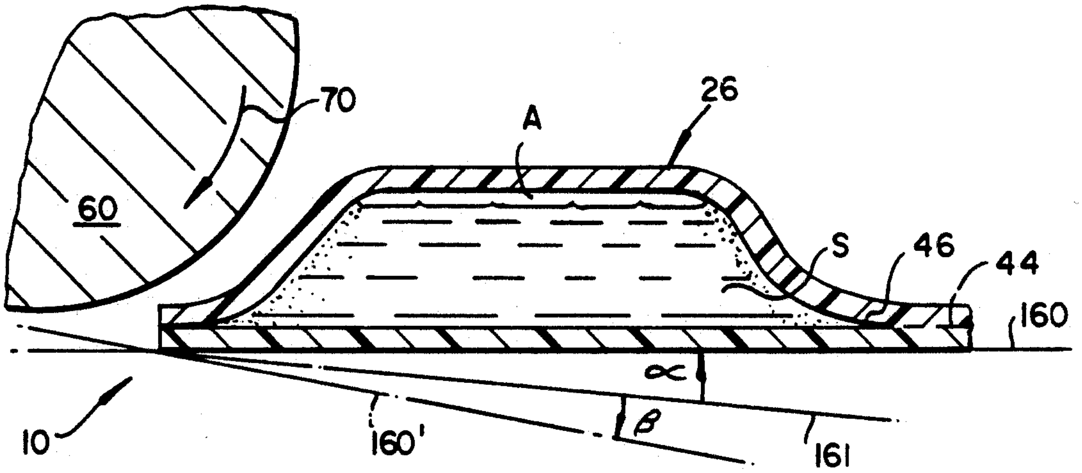
FIGS. 3A–3C are fragmentary elevational views in section illustrating the interaction between the processor and the cuvette, and particularly
Figure 3B:
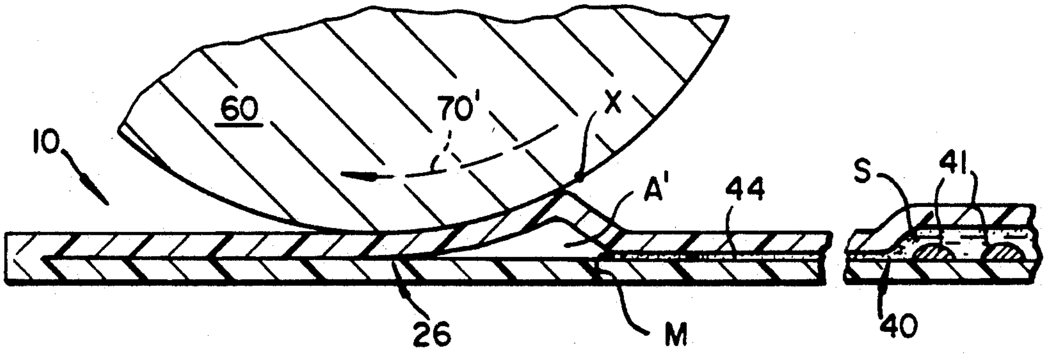
Figure 3C:
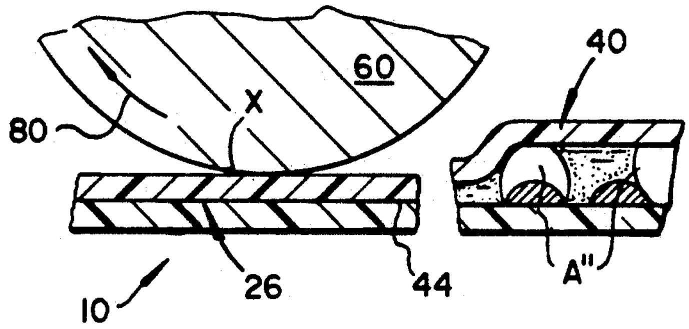

The critical steps in the process of the invention are more readily apparent in FIGS. 3A-3C. A roller 60 applies exterior pressure by rolling, arrow 70, to burst a compartment, e.g. compartment 26 shown by way of example, to then force seal 46 to break to release flow out passageway 44, FIGS. 3A and 3B, of cuvette 10 on support 160. When it reaches the position shown in FIG. 3B, roller 60 has done nothing more than has been taught by the two aforesaid EPA disclosures—solution S is expressed or transferred through the passageway (44 as shown) to detection chamber 40 to react with sites 41. At this point, only solution S is present in chamber 40. The residual air "A" shown in FIG. 3A is left behind as a pocket of air, A' in FIG. 3B, in the original compartment 26, as shown by the presence of meniscus M. A representative example of such a pocket is about 30 μl, which could constitute, for example, about 10% of the total original volume of compartment 26.

Support 160 is shown to be mountable at a positive angle alpha from the horizon, the latter being depicted as plane 161. That is, cuvette 10 is held at a generally horizontal position, which is used herein to mean, preferably with angles alpha=beta=zero. However, the cuvette is operative with angle alpha being as much as 20°, and still further, angle beta can be ≦170° for an optional location 160' of the support. (The cuvette can be tilted down instead of up.) The reason for these limits regarding beta and alpha is that outside of these limits, the air bubbles of retained air do not flow as described herein.

In accordance with the invention, roller 60 does NOT proceed at this point via arrow 70'. Instead, it stops and waits for an incubation period to take place at chamber 40, ensuring that any residual air REMAINS as a pocket on compartment 26 and is not pushed into chamber 40. Such incubation is needed, e.g., for the liquid of compartment 26, to allow the biotinylated target (e.g., replicated DNA) to anneal to a complimentary probe of nucleic acid molecules on sites 41, as is conventional. The actual incubation reaction of course varies, depending upon which compartment has been burst by roller 60. If and when the compartment is compartment 30, the incubation period is needed to allow the strep-avidin HRP to complex with the biotin of the now-captured DNA. However, in the case of compartment 32, a wash compartment, no incubation is needed. Finally, for compartment 34, incubation is useful to allow complete interaction between captured strep-avidin HRP and the substrate of the solution.

Such incubation periods will of course vary depending on the strength and type of reagents involved. By way of example, the following times are useful for the exemplified reagents discussed above (as can be readily determined by one skilled in the art):

Compartment 26—5 min.
Compartment 30—2-5 min.
Compartment 32—1 sec.
Compartment 34—5 min.

The important point is that by retaining roller 60 at a location on top of the compartments as shown, the residual air pocket for each compartment (if any) is retained in the compartment, and is not transferred to chamber 40. This is important even for pre-filled compartments 30 and 34 since, as noted above, one can never be certain if attempts to exclude air in the manufacturing process are a) successful and/or b) even worth the cost of such attempts. (It is also useful for compartment 32 if, unlike the examples above, substantial incubation is required for a reagent present other than a wash reagent.)

Thereafter, FIG. 3C, roller 60 is advanced to a location that completes the crushing of compartment 26, as shown by movement of point X on the roller from its position in FIG. 3B to that of FIG. 3C, and the resulting expulsion of the air pocket so that it appears as air bubbles A" in chamber 40. At this juncture, the air is innocuous in the chamber since the needed reactions are complete. Roller 60 preferably continues on rolling, arrow 80, to carry it on to the next compartment in the sequence. As noted above, the steps of squeezing out liquid but not residual air, stopping and waiting for incubation, and then squeezing out the residual air, are repeated for at least compartments 30 and 34.

Figure 4A:
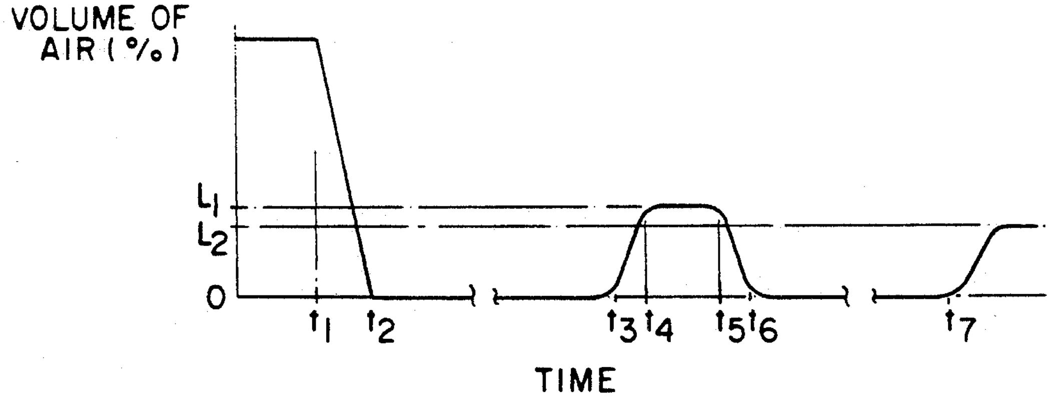
FIGS. 4A and 4B are timing diagrams of the resultant flow conditions in the detection compartment.
Figure 4B:
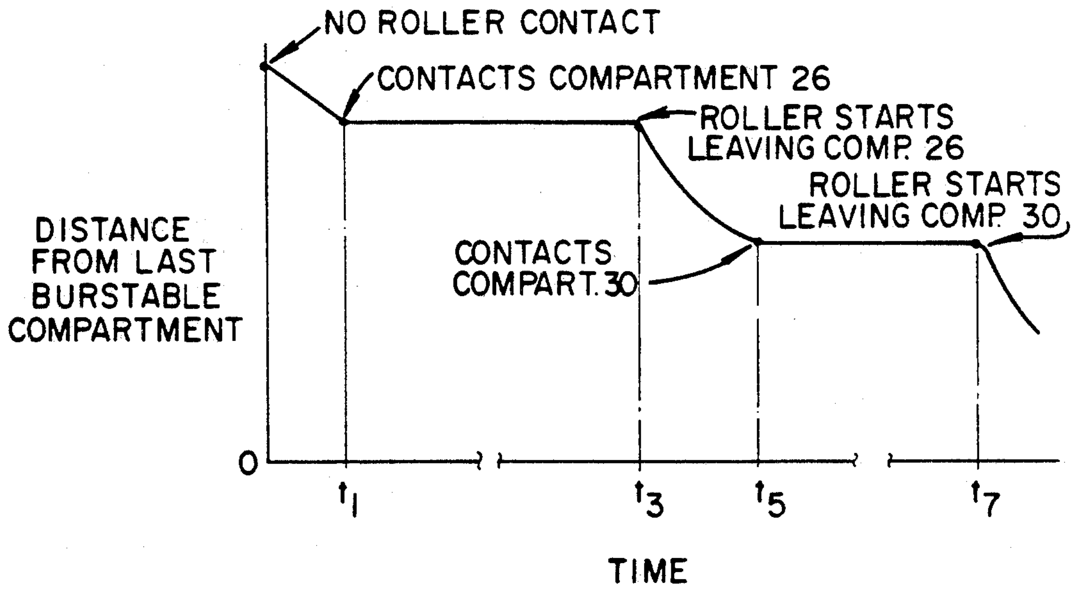

The total sequence of events is preferably controlled by a properly programmed computer that is part of processor 100, FIG. 2. Any conventional programming can be used, as will be apparent. Useful timing diagrams to guide in the programming are shown in FIGS. 4A and B. That is, up until time $t_1$, FIG. 4A, air only is present in chamber 40. However, at time $t_1$ roller 60 makes its first breakthrough at seal 46 and liquid traverses into chamber 40, FIG. 4B. so that at time $t_2$, all the volume is filled with liquid (hence, the volume of air is essentially zero). Roller 60 remains in the position or location shown in FIG. 3B through time $t_3$, FIG. 4B, which is the incubation time described above. (As roller 60 advances, its position from the zero point in FIG. 4B is shown as decreasing. A constant position, e.g. from time $t_1$ to time $t_3$, represents substantially no advance of roller 60.) Then, it advances to squeeze out the residual air and if any is present, the volume of air increases to some level $L_1$, time $t_4$, which may be as much as 95% of the total volume. From time $t_4$ to time $t_5$, the air remains at % $L_1$, until time $t_6$ which is when the roller 60 moves so that the next compartment in sequence is burst. Since the next compartment 30 also requires incubation, starting with time $t_6$, the % volume of air, due to roller 60's position in FIG. 3B, remains at essentially zero until time $t_7$, when the roller squeezes out whatever residual air remains at that compartment to a % level of $L_2$, and so forth.

In the above description, "essentially zero % volume of air" means, an insignificant volume, which preferably is zero but which can be 1 or 2%, so long as the volume is so small as to have no detectable effect on the incubation reaction in question.

Figure 5:
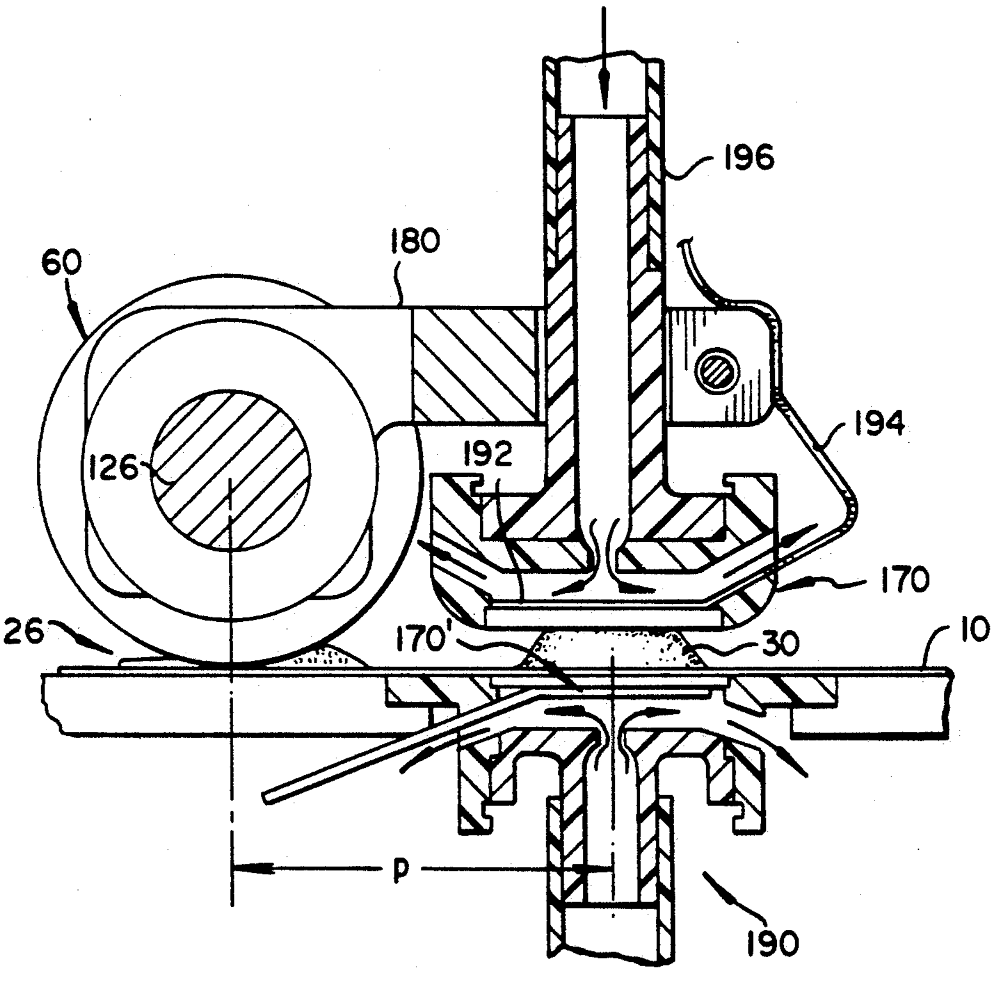
FIG. 5 is an elevational view in section illustrating the pressure member and heater of the processor as it is used in an alternate embodiment of the invention.

In some cases, heaters 170, FIG. 2, are optionally used during the aforenoted incubation periods, to heat the next sequential compartment prior to its bursting. The manner in which this is preferentially carried out is shown in FIG. 5. That is, roller 60 is carried by axle 126 to process a cuvette 10 by bursting a compartment 26, as described above. While roller 60 remains on the compartment as was shown for FIG. 3B, heater 170 carried via yoke 180, FIG. 5, on axle 126, is effective to heat the next compartment (shown as 30), with or without supplemental heat from an underneath heater 170' at a station 190. As is taught by EPA 402,994, such heaters preferably utilize an electric element 192 supplied with current via a cable 194, and are cooled by a blast of cooling gas supplied via tube 196.

In accord with another aspect of the invention, to render this possible, the pitch or distance "p" between the center of heater 170 and the center of axle 126, FIG. 5, is rendered to be substantially equal to the pitch or spacing $p_1$, $p_2$, and $p_3$ etc., FIG. 1, between each successive compartments, here measured from burst seal to burst seal. That is, distance $p_1$ preferably equals $p_2$ which preferably equals $p_3$, etc. all of which preferably equals "p". Of course, in those instances in which no heat is needed, the distance between compartments can be not equal to distance "p", e.g., since compartment 32 containing a wash reagent is unlikely to ever require heat, distance $p_2$ can optionally not equal distance "p".

The invention disclosed herein may be practiced in the absence of any element which is not specifically disclosed herein.

The invention has been described in detail with particular reference to certain preferred embodiments thereof, but it will be understood that variations and modifications can be effected within the spirit and scope of the invention.

What is claimed is:

1. A method of preventing air from interfering with liquid reactions involving a solution in a detection chamber, the solution being transferred to said detection chamber from a first burstable compartment connected via a passageway in a generally horizontally positioned cuvette and containing both said solution and residual air, the method comprising the steps of:

a) bursting said first compartment with pressure applied by exterior pressure means that pushes said solution into said detection chamber but not said residual air, b) keeping said pressure means on said first compartment at a location sufficient to leave residual air in said first compartment during the time of said liquid reactions in said detection chamber, and c) thereafter, also ejecting any residual air left in said first compartment by pressure exerted by said exterior pressure means.

2. A method as defined in claim 1, wherein said steps a) and b) comprise rolling a roller onto said first compartment to generally the middle of said compartment, so that liquid but not residual air is expelled.

3. A method as defined in claim 2, wherein said step c) comprises rolling said roller completely across said first compartment and then off said first compartment.

4. A method as defined in claim 1, and further including the step of heating a second burstable compartment while said first compartment is operated on by steps a) and b) and prior to step c), said heating being accomplished by a heater element spaced from said exterior pressure means by a distance that is approximately equal to the spacing between said first and second compartments.

5. A method as defined in claim 1, and further including, prior to said step a), the step of placing said cuvette on a non-horizontal support.

6. A method of processing a flexible cuvette comprising sequence compartments each temporarily sealed from communication with other compartments by a burstable seal and having a liquid in a portion only of at least one of said compartments, and a detection compartment into which said sequence compartments feed when said seal is burst, said sequence compartments being positioned to be sequentially burst;

the method comprising the steps of bursting the seal of one of said sequence compartments with the cuvette positioned generally horizontally, to force its contents into said detection compartment, waiting for an incubation period, bursting the seal of said next sequence compartment, and repeating said bursting and waiting steps at least one more time at another of said sequence compartments;

said bursting being accomplished by applying exterior pressure across a surface of said burstable sequence compartments in the following sequence of steps:

a) bursting the sequence compartment by applying pressure at a location sufficient to burst said seal but insufficient to express residual air bubbles therefrom, b) maintaining the location of said applied pressure as in step a) during the entire incubation step required by the contents of said burst sequence compartment, so that residual air bubbles remain in said burstable sequence compartment and c) then applying pressure to express residual air from said already burst sequence compartment, so that the residence time of residual air bubbles in said detection compartment is minimized.

7. A method as defined in claim 6, wherein said pressure is applied by rolling a pressure member in a sequence of steps across said burstable sequence compartment.

8. A method as defined in claim 5, and further including, prior to said step a), the step of placing said cuvette on a non-horizontal support.

* * * * *

UNITED STATES PATENT AND TRADEMARK OFFICE

CERTIFICATE OF CORRECTION

PATENT NO. : 5,254,479

DATED : October 19, 1993

INVENTOR(S) : John B. Chemelli and Richard J. Versluys

It is certified that error appears in the above-indentified patent and that said Letters Patent is hereby corrected as shown below:

On the title page, item [75], after "Webster, N.Y.", add --Richard J. Versluys, Spencerport, N.Y.--

Signed and Sealed this

Thirteenth Day of September, 1994

Attest:

BRUCE LEHMAN

*Attesting Officer* *Commissioner of Patents and Trademarks*